/ United States Patent /  Peddada et al.

(10) Patent No.: US 10,644,890 B1
(45) Date of Patent: *May 5, 2020

(54) LANGUAGE-AGNOSTIC SECURE APPLICATION DEPLOYMENT

(71) Applicant: salesforce.com, inc., San Francisco, CA (US)

(72) Inventors: Prasad Peddada, Alameda, CA (US); Ryan Guest, Stockton, CA (US); Jonathan Brossard, San Francisco, CA (US); Travis Emmert, Becker, MN (US)

(73) Assignee: salesforce.com, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,245

(22) Filed: Jun. 29, 2017

(51) Int. Cl.
*H04L 9/32* (2006.01)
*H04L 9/08* (2006.01)
*H04W 12/04* (2009.01)
*H04W 12/08* (2009.01)
*H04W 12/06* (2009.01)

(52) U.S. Cl.
CPC .......... *H04L 9/3263* (2013.01); *H04L 9/0894* (2013.01); *H04W 12/04* (2013.01); *H04W 12/08* (2013.01); *H04W 12/06* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

FOREIGN PATENT DOCUMENTS

EP 1367764 A2 * 12/2003 ............ H04L 9/0822

OTHER PUBLICATIONS

Hwang et al., A Business Model for Cloud Computing Based on a Separate Encryption and Decryption Service, 2011, IEEE.

(Continued)

*Primary Examiner* — Fatoumata Traore
(74) *Attorney, Agent, or Firm* — Sterne, Kessler, Goldstein & Fox P.L.L.C.

(57) ABSTRACT

The disclosed technology for a hardware system to access a secure backend system uses non-volatile memory to hold encrypted secrets, volatile memory to hold decrypted secrets ready for use, a keys-for-all (K4A) server, and app servers running K4A clients. To access the backend system in production, each app server uses a decrypted secret and a certificate that identifies the app server and certifies its role and physical and logical location. At initialization of the app server, a K4A client is instantiated that launches and tracks processes, running on the app server, that are authorized to request decryption services. The K4A client responds to a decryption request from an authorized process, determined based on tracking of processes launched, by requesting decryption by a K4A server, using the certificate, and returns to the process, in volatile memory, a decrypted secret or a reference to the decrypted secret, decrypted by the K4A server.

25 Claims, 7 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,820,063 B1* | 11/2004 | England .................. G06F 21/10 705/50 |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,626,525 B2 | 4/2017 | Momchilov et al. |
| 2001/0044791 A1 | 11/2001 | Richter et al. |
| 2002/0065782 A1* | 5/2002 | DeFilippo ........ G07B 17/00733 705/62 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0187993 A1* | 8/2005 | Selman .................. G06F 21/604 |
| 2006/0150145 A1* | 7/2006 | Khandekar ............ G06Q 40/04 717/106 |
| 2008/0317248 A1 | 12/2008 | Naono et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2012/0331519 A1* | 12/2012 | Yu ......................... G06F 21/12 726/1 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0222604 A1 | 8/2015 | Ylonen |
| 2017/0171174 A1 | 6/2017 | Campagna |

(56) References Cited

U.S. PATENT DOCUMENTS

2017/0171219 A1 6/2017 Campagna
2018/0115535 A1 4/2018 Mehta

OTHER PUBLICATIONS

Oracle, Oracle Fusion Middleware—Security Overview 11g Release 1 (11.1.1), Jun. 2010, Oracle.

\* cited by examiner

LANGUAGE-AGNOSTIC SECURE APPLICATION DEPLOYMENT

RELATED APPLICATION

This application is related to co-pending U.S. patent application Ser. No. 15/638,249 by Peddada et al., entitled "LANGUAGE-AGNOSTIC SECURE APPLICATION DEVELOPMENT" filed on Jun. 29, 2017, which is incorporated herein by reference in its entirety.

FIELD OF DISCLOSURE

The field of disclosure is protective digital privacy measures that prevent unauthorized access to computers, databases and websites. The disclosed technology for enhanced data security includes encryption of all secrets at rest, with separate hardware components for retention, high volume key decryption and eventually concurrent key management.

The methods disclosed include managing digital data for a plurality of tenants to software instances, each tenant of the plurality of tenants comprising a group of users who share a common access with a specific set of privileges to a software instance of at least one application.

INTRODUCTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

As businesses build larger data repositories for big data analytics, protection of data at rest is becoming a key concern among security administrators. Compliance and regulation requirements are designed to protect consumer information, personal data and customer information from unauthorized sources. As more customers store personally identifiable information (PH), sensitive, confidential or proprietary data, enterprises must ensure the privacy and confidentiality of that data—to meet both external and internal data compliance policies.

The problem of protecting data that leaves the premise and traverses the cloud is a challenge that takes precedence for today's connected businesses. Some analysts are estimating that by 2017 two-thirds of all workloads will be processed in the cloud and 1.4 zettabytes (1.4 times ten to the twenty-first power) of data will be flowing over global networks meaning that the majority of data will be in motion and remain in motion as it traverses the cloud. The concept of data at rest is undergoing redefinition—data at rest is moving into the cloud at least partly due to hosted big data analytics platforms, cloud based Hadoop file systems and cloud-based backup and disaster recovery systems.

The confidentiality, integrity, and availability of customers' information are vital to enterprise business operations, which use a multi-layered approach to protect that key information, monitoring and improving applications, systems, and processes to meet the growing demands and challenges of security. Enterprise developers need to be able to build and maintain a layer of trust, transparency, compliance, and governance into business-critical apps—to support the unique compliance and governance requirements of customers who need an extra level of control to meet internal or regulatory compliance requirements.

Existing approaches in use by enterprise developers for securely deploying a new release to a production platform require hand holding—often with a human administrator assigned to manage user permissions to secrets, including the tenant secrets for an organization—generating, archiving, exporting, importing, and destroying secrets. Additionally, developers and quality engineers lack tools for validating what gets deployed to production. Developers need a better mechanism for sharing and distributing secrets that are used by applications.

The disclosed technology simplifies deployment of secrets to production, and is usable for mediating access by developers to secrets, including passwords, needed for deploying applications to production servers and for running enterprise applications. Additionally, if the physical security of a server is compromised, hardware failure occurs, or it becomes important to add more machines quickly, additional servers can be instantiated without re-encrypting secrets everywhere and spreading workload among servers and organizing workload on old version servers and new servers. The disclosed secret file architecture makes it feasible to scale readily, and incrementally encrypt secrets to maintain security.

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed technology for implementing a hardware system used to access a secure backend system includes a plurality of hardware components that use non-volatile memory to hold encrypted versions of secrets at rest and that use volatile memory to hold decrypted versions of secrets ready for use. The hardware components include a keys-for-all (abbreviated K4A) server, and app servers running K4A clients. We refer to servers running K4A clients as app servers simply to distinguish them from K4A servers and backend servers from which they request service. Any server that runs a K4A client qualifies as an app server. Each app server that uses a decrypted secret in production to access the secure backend system further includes a certificate that identifies the server and certifies its role and certifies its physical and logical location within a location span. At initialization of the app server, a K4A client is instantiated that launches and tracks processes, running on the app server, that are authorized to request decryption services; and the K4A client responds to a decryption request from an authorized process, determined based on the tracking of the processes launched, by requesting decryption by a K4A server, using the certificate, and returns to the authorized process, in volatile memory, a decrypted secret or a reference to the decrypted secret, decrypted by the K4A server.

Additional disclosed technology includes a K4A client having versions used to provide access to a K4A server from which secrets are obtained for use with a backend sever, during both development and production, implemented as a device. The K4A client is configurable to provide indirect access by name to secrets used to access a backend server, with the indirect access applying during both development and production, within respective development and production domains. The K4A client is configurable to launch an app server component that can be authorized, dependent on the launch, to request access to secrets; to obtain decrypted secrets from the K4A server, responsive to a request from the authorized app server component; and to make the decrypted secrets retrievable by the authorized app server component, in a file package stored in a secure file system residing in an OS-protected user space within a volatile memory, using a name of the file package to interact with the secure file system. A digital certificate in memory securely identifies the app server and certifies its role and certifies its location within a location span. The K4A client is operable to track the app server component, during production, after launch and verify that request messages for the decrypted secrets originate from the app server component launched by the K4A client and to process a request from the app server component by sending the K4A server a request, during development and production, accompanied by the certificate and obtaining from the K4A server the decrypted secrets.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
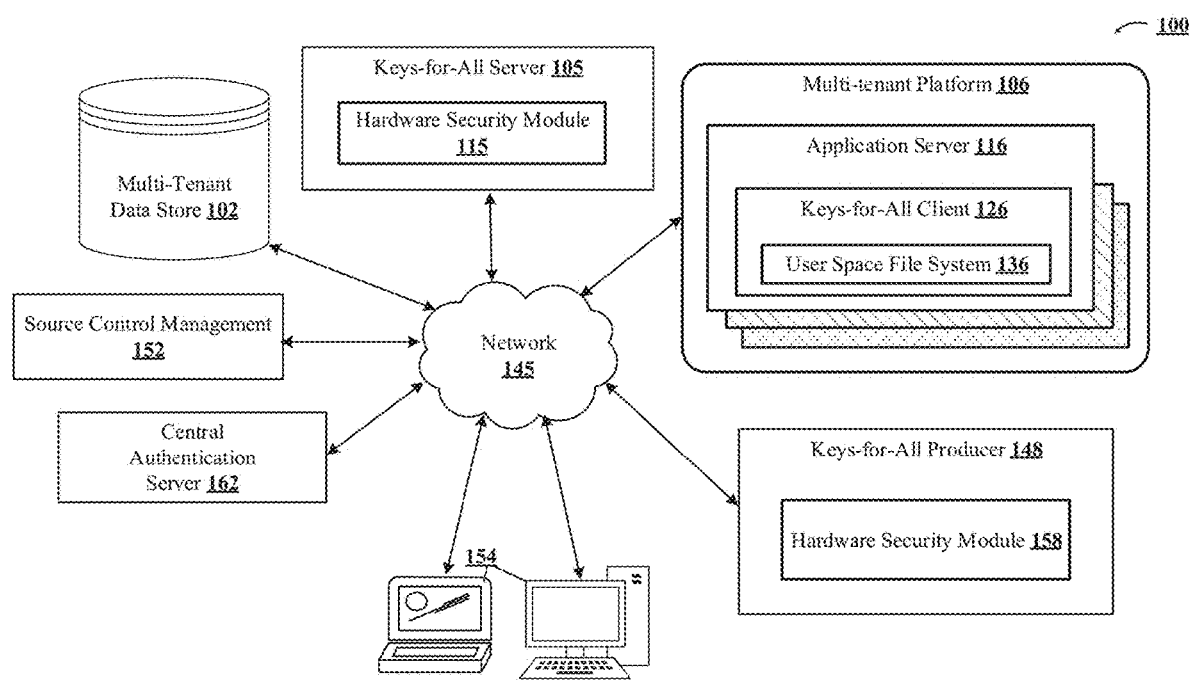
FIG. 1 illustrates an environment for mediating access by developers to secrets they need to deploy to, and use in, production app servers.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Modern enterprise data centers are complex and their infrastructure needs to be able to incorporate ongoing updates. A global data center (DC) can include super-pods (SP) and points of deployment (PODs). Super-pods offer dedicated connections and guaranteed data residency for security and governance-minded organizations that need to identify their network in a specific datacenter in a chosen country, and need to have the option of auditing and encrypting it in specific selected ways. A cluster in a data center can host services shared among several different pods. Each pod can serve tens of thousands of customers with multi-tenant services. Each end user is connected to a point of deployment (POD) which includes different roles, including web server, database server, logging metrics server and additional servers to index data and transform customer data. Each app delivers a service that can include multiple functional roles. In an example, a certified role refers to one service such as marketing, customer relationship management or user interface (UI). In one use case, an enterprise can partition customer data based on a column in the database, such as an ORG ID. A certified physical and logical location within a location span refers to a physical location of a data center, such as Chicago (CHI) or CN (China) or European Union (EU). It further refers to a logical location that distinguishes among roles of servers in a particular physical location. One example of different roles of servers is commercial versus government servers. The government servers are subject to stringent rules and regulations, for permissible traffic and security clearances for developers, and a public server typically handles broader traffic patterns. In some cases, secrets need to be held in data centers over which the enterprise has physical control. In other cases, secrets can be held in a data center in rented facilities. A multi-tenant environment of enterprise systems with infrastructure secrets can utilize cryptographic primitives for partitioning between distinct services, allowing one service and tenant to have different data and secrets for providing access than another service and tenant.

Internal developers at an enterprise need tools for securely deploying platform applications and associated key material in a programming-language agnostic fashion. The disclosed methods and systems for mediating access by developers, to secrets they need to deploy to and use in production app servers, removing security as the choke point for developing and deploying applications to production. Another aspect of the disclosed technology includes making key material security and key rotation transparent for developers—easing the process of automating key rotation for customers who need daily security key changes. Key rotation need not be tied to production releases.

An enterprises' Computer Security Incidence Response Team (CSIRT) has among its goals, minimizing the number of users who have escalated privileges for accessing secret material. The disclosed system minimizes access to key material to users with root privileges and reduces the number of users with escalated privileges. The enterprise can utilize multi-factor authentication to confirm a user's claimed identity by utilizing a combination of two different components. For example, when using two-factor authentication, a user is only granted access after successfully presenting several separate pieces of evidence to an authentication mechanism—typically at least two of the following categories: knowledge (something they know), possession (something they have), and inherence (something they are). In one implementation, a hardware authentication device, called a YubiKey, supports one-time passwords, public key encryption and authentication, and the Universal 2nd Factor (U2F) protocol developed by the Fast IDentity Online (FIDO) Alliance—a consortium launched to address the lack of interoperability among strong authentication devices. YubiKey allows users to securely log in to their accounts by emitting one-time passwords or using a FIDO-based public/private key pair generated by the device. YubiKey also allows for storing static passwords for use at sites that do not support one-time passwords.

The disclosed technology minimizes access to key material to a minimum number of users with escalated privileges, for developers to securely develop and deploy applications and associated key material, as described infra. An environment for mediating access by developers, to secrets they need to deploy to and use in production app servers is described next.

Environment

FIG. 1 illustrates one environment 100 for mediating access by developers to secrets (passwords) they need to deploy to, and use in, production applications on app servers, to access a secure backend system. Environment 100 includes multi-tenant platform 106 for an enterprise, which includes application server 116 with production applications for one or more of customer relationship management (CRM), sales, service, marketing, data analytics and customized applications. Application server 116 includes user space file system 136, which can be implemented as a filesystem in user space (FUSE) in which multiple users create their own file systems. User space file system 136 includes temporary memory, also referred to as volatile storage. Another implementation can utilize a different solid state file system such as NFS-Ganesha user-mode file server. Multi-tenant platform 106 also includes keys-for-all client 126 for retrieving encryption keys and decrypting secrets. Keys-for-all client 126 administers platform-level encryption, designed to allow retention of critical app functionality—like search, workflow, and validation rules—as well as full control over encryption keys, setting encrypted data permissions to protect sensitive data from unauthorized users.

Environment 100 also includes multi-tenant data store 102 configured to store customer data across an enterprise. Multi-tenant data store 102 includes personal data and customer information in database tables, relationships and UI elements—including, but not limited to metadata—data about the data itself. Multi-tenant data store 102 saves data at rest. After data that is "on-the-move" reaches its intended destination and is stored, it is considered "data at rest" (DAR) when stored in non-volatile memory. Three types of NAND flash used as basic building blocks for non-volatile solid-state memory include multi-level cell (MLC) memory commonly used in USB sticks and SD cards, single-level cell (SLC) memory, and enterprise MLC (eMLC). Encrypted versions of secrets are stored at rest, in multi-tenant data store 102.

Also included in environment 100 is keys-for-all server 105, from which apps can request the decryption key associated with the application being deployed—a process described in detail infra. Keys-for-all server 105 includes hardware security module (HSM) 115 that includes a dedicated crypto processor that is specifically designed for the protection of encryption keys (secrets) inside a hardened, tamper-resistant device. For some implementations, a non-hardware based HSM can be utilized, such as in virtual environments, for use in parts of the world in which the hardware HSM is not available, and for use in small companies. Geopolitical considerations apply to some countries, such as Australia and some EU countries, which restrict trans-border data flow of certain decrypted data, such as personal data, and do not allow secrets that enable decryption of restricted data to leave their country. For those countries, separate certified physical and logical locations implement separate app servers with apps with independent certificates. Separate HSMs can be provided in each geopolitical jurisdiction that restricts trans-border data flow of the decrypted data for each server. In one implementation, a virtual app server can be implemented with apps with independent certificates.

Each app server or cluster in a data center of app servers can have a separate HSM. The HSM can be synchronized to be eventually consistent.

Environment 100 further includes source control management 152—a component for software configuration version control—for managing changes to application metadata, which includes encrypted secrets and keys. In one implementation, source control management 152 is implemented using Git. In another case, Perforce, Subversion or other version control software can be utilized.

Environment 100 also includes central authentication server 128 for controlling access to on-demand application programs—enabling an administrator to grant access for a support user to read-only privileges to metadata of the application, and to grant access by a third party to the application as an organization user for a limited term. Environment 100 additionally includes keys-for-all producer server 148 with hardware security module (HSM) 158 that includes a dedicated crypto processor. In some implementations, a non-hardware based HSM can be utilized. In some use cases, keys-for-all producer server 148 holds the certificates of all of the keys-for-all servers in the global system. In other use cases, a distinct keys-for-all producer server 148 is implemented for each different service platform provided by an enterprise.

User computing device 154, also included in environment 100, provides an interface for administering access to developers to use for creating and managing secrets, via both browser UIs and mobile applications, for limiting access to authorized users and managing access for users. In some implementations, user computing devices 154 can be a personal computer, laptop computer, tablet computer, smartphone, personal digital assistant (PDA), digital image capture devices, and the like.

In some implementations, the modules of environment 100 can be of varying types including workstations, servers, computing clusters, blade servers, server farms, or any other data processing systems or computing devices. Modules can be communicably coupled to the data store via a different network connection. For example, multi-tenant platform 106 can be coupled via the network 145 (e.g., the Internet) with user space file system 136 coupled to a direct network link, and can additionally be coupled via a direct link to multi-tenant data store 102. In some implementations, user computing device 154 may be connected via a WiFi hotspot.

In some implementations, network(s) 145 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

To ensure that customers have a secure connection from their browsers to the enterprise service, an enterprise platform uses global certificates, connecting via transport layer security (TLS) cryptographic protocols. Individual user sessions are identified and re-verified with each transaction, using a unique token created at login to access the secure backend system.

Figure 2:
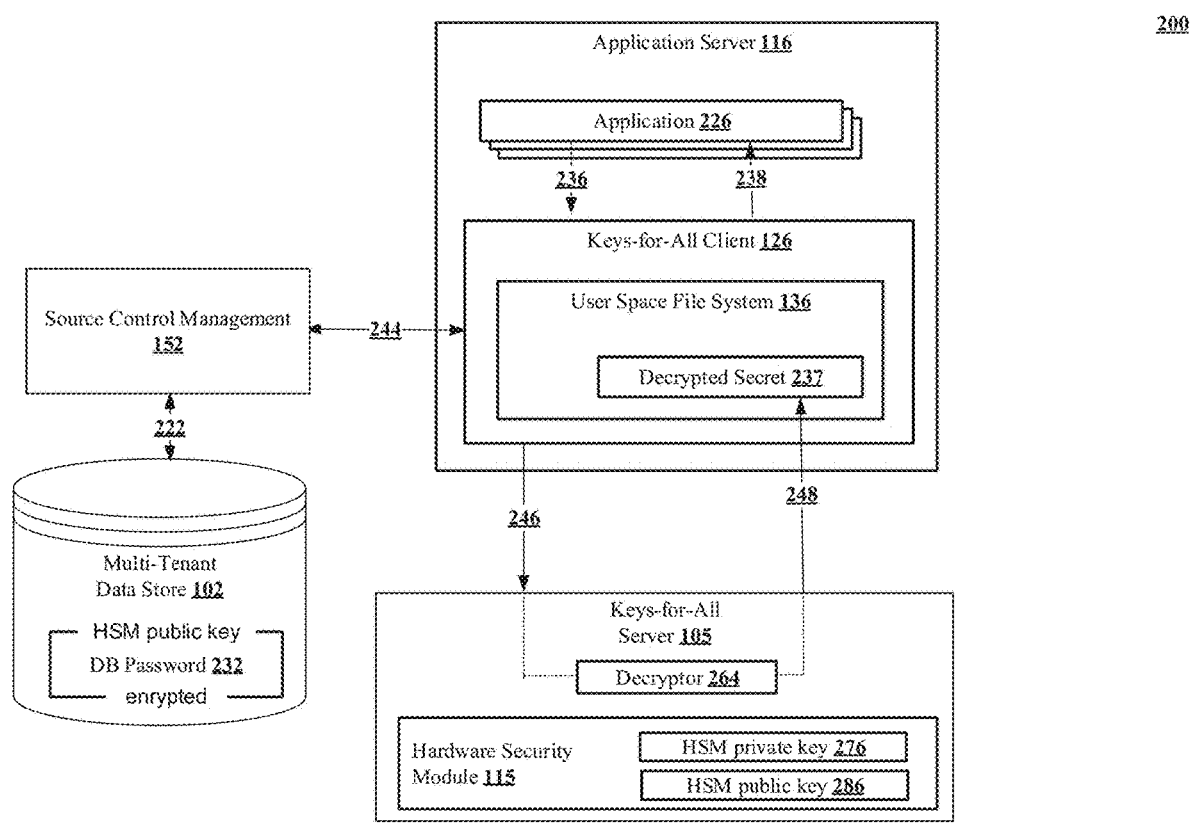
FIG. 2 shows an example block diagram of the run-time architecture for a production system for mediating access to secrets, including passwords, needed for running enterprise applications.

FIG. 2 shows an example block diagram of the run-time architecture for the disclosed technology for a production system for mediating access to secrets, including passwords, needed for running enterprise applications. At initialization, application server 116 instantiates keys-for-all client 126, which includes in-memory user space file system 136. Keys-for-all client 126 launches and tracks processes running on the app server that are authorized to access secrets request decryption services. An example startup script, written in golang, is described next. The startup script gets called by outside process 'release runner' shown infra. Inside that command in the script, 'secretsDir' is the location where the zip file with all the encrypted secrets lives. In this example, it is '../sfdc/config/app-out.zip'. Role refers to the name of the application—in this example, 'app'. Other example application names include "LiveAgent" for an enterprise online chat service or "marketing" for an enterprise marketing app. 'Args' are the arguments needed to start the core application—in this example, 'sfdc.jar'.

ant -q start
    ./k4a-client -secretsDir ../sfdc/config -role "app" -args "-jar sfdc.jar"
    args:=strings.Split(*arguments, " ")
    cmd:=exec.Command(*command, args . . . )
    cmd.Stdout=os.Stdout
    cmd.Stderr=os.Stderr
    err=cmd.Start( )

Keys-for-all client 126, 'k4a-client' in the example, retrieves all the secrets, unzips the zip file (app-out.zip), and sends the JSON file and the encrypted key encryption key ('kek') to keys-for-all server 105. Then, keys-for-all client 126 starts the application using exec. After 'cmd.start( )' runs, as listed in the above command sequence, the file system is up and the app is started.

The disclosed technology is language agnostic. In another implementation, a different language such as C or C++ can be used. In another example, different applications can be started, as listed next, for a java server and for a python server.

cmd:=exec.Command("java", "-jar sfdc.jar")
    cmd:=exec.Command("python", "sfdc.py")

Keys-for-all client 126 tracks the process identifier (PID) that uniquely identifies application 226 on application server 116. In one implementation, processes are in Java, which uses one process for its requests. In other cases, processes can utilize a different programming language, such as Python, golang, PHP, C or C++. In one example, some Apache processes can have a grandchild process and not a child of the process, and the PID can be used to open a grandchild process. When a child process or grandchild of a process is identified by the same PID, keys-for-all client 126 treats that process as an authorized process—a child process or grandchild process of a process that keys-for-all client 126 launched. Process tracking occurs at runtime. As a request for a secret comes in, the process gets its process id (often abbreviated as 'pid'), looks up the process id of the requesting process, and then checks the process table to make sure that the process making the request is a child process of the currently running process.

Keys-for-all client 126 includes business logic that implements rules to determine who can access its data. Next we describe mechanisms being utilized for confirming that keys-for-all client 126 only responds to legitimate requests for decryption of keys that are encrypted at rest in the source archive, and receives the correct decryption keys.

Continuing with FIG. 2, when the app is being deployed, application 226 requests the decryption key associated with the app—sending a reference, typically a path on a file system, to keys-for-all client 126. Keys-for-all client 126 processes request 236 for key decryption, and requests and receives 244 the zipped file via source control management 152, via message 222, from the location in multi-tenant data store 102 pointed to by the reference path.

Further continuing with FIG. 2, keys-for-all client 126 utilizes public key infrastructure (PKI) to authenticate with keys-for-all server 105. Each application server 116 has a unique security certificate that securely identifies the app server and its role and its physical and logical location within a location span. That is, keys-for-all client 126 responds to a decryption request from an authorized process by requesting decryption by keys-for-all server 105, using the unique security certificate, and sending the full body of the encrypted zipped file to keys-for-all server 105. The disclosed technology implements cryptography standard ITU-T X.509, which specifies formats for public key certificates, certificate revocation lists, attribute certificates, and a certification path validation algorithm, to manage digital certificates and public-key encryption. Keys-for-all client 126 sends decryption request 246 associated with the application PID and application certificate to keys-for-all server 105 which validates the multiplexed transport layer security (mTLS) connection using the IP address and name of the requesting application server 116. Each application certificate can contain information about the application, including the role. The mTLS design provides application multiplexing over a single TLS (or DTLS) session. Instead of associating a TLS connection with each application, mTLS can allow several applications to protect their exchanges over a single TLS session. In one example, the mTLS includes a bidirectional check for spoofing: a situation in which one person or program successfully masquerades as another by falsifying data, thereby gaining an illegitimate advantage. Keys-for-all server 105 also confirms that the process asking for the file is a process allowed to receive the file, before returning the advanced encryption standard (AES) decryption key. The algorithm described by AES is a symmetric-key algorithm, meaning the same key is used for both encrypting and decrypting the data. The disclosed system also includes RSA encryption, an asymmetric cryptographic algorithm in which there are two different keys—also called public key cryptography, because one of the keys can be given to everyone. The other key must be kept private. Other implementations can utilize any public key based system that supports encryption and decryption. An additional layer of security between keys-for-all client 126 on application server 116 and keys-for-all server 105 that decrypts keys utilizes domain name system security extensions (DNSSEC) for verifying the hostname, thus adding security to the domain name system (DNS) protocol by enabling DNS responses to be validated. Specifically, DNSSEC is implemented to provide origin authority, data integrity, and authenticated denial of existence between keys-for-all client 126 on application server 116 and keys-for-all server 105.

Continuing with FIG. 2, keys-for-all server 105 is coupled with keys-for-all client 126 via the secure physical routing protocol described supra. Keys-for-all server 105 processes a decryption request from keys-for-all client 126 by utilizing decryptor 264 in reliance on the app server certificate received from keys-for-all client 126 that certifies a role and certifies a physical and logical location within a location span. Keys-for-all server 105 only decrypts keys received from keys-for-all client 126 that are consistent with the certified role and the certified physical and logical location and further consistent with secure physical routing over which the decryption request is received. By decrypting only keys that are consistent with the certified role, the disclosed system limits the threat to a platform segment of an enterprise. In one implementation, the certified role must match the app segment, with matching features such as whether the UI is delivered via a web interface or via a mobile application.

Keys-for-all server 105 includes hardware security module (HSM) 115 with HSM private key 276 and HSM public key 286, configured to perform encrypting and decrypting operations. In one example, HSM private key 276 may be used to decrypt data previously encrypted using the corresponding HSM public key 286. A password may be required to access HSM 115. Keys-for-all client 126 retrieves the AES key, decrypts the key material, and returns, via message 248 the clear password. Message 248 includes decrypted secret 237 or a reference to the decrypted secret, decrypted by keys-for-all server 105. Keys-for-all client 126 stores the clear password in volatile memory in user space file system 136 and provides the decrypted secret to application 226 via message 238.

Developers request encryption of passwords and secrets in preparation for deploying applications to a production environment on a platform. In one use case, a key needs to be replaced due to potential compromise of security by a change of personnel. In another use case, an enterprise requires rotation of secrets on a regular schedule. In one example, the key can be rotated every twenty-four hours. In another example, the secrets can need to be updated weekly, or monthly.

Figure 3:
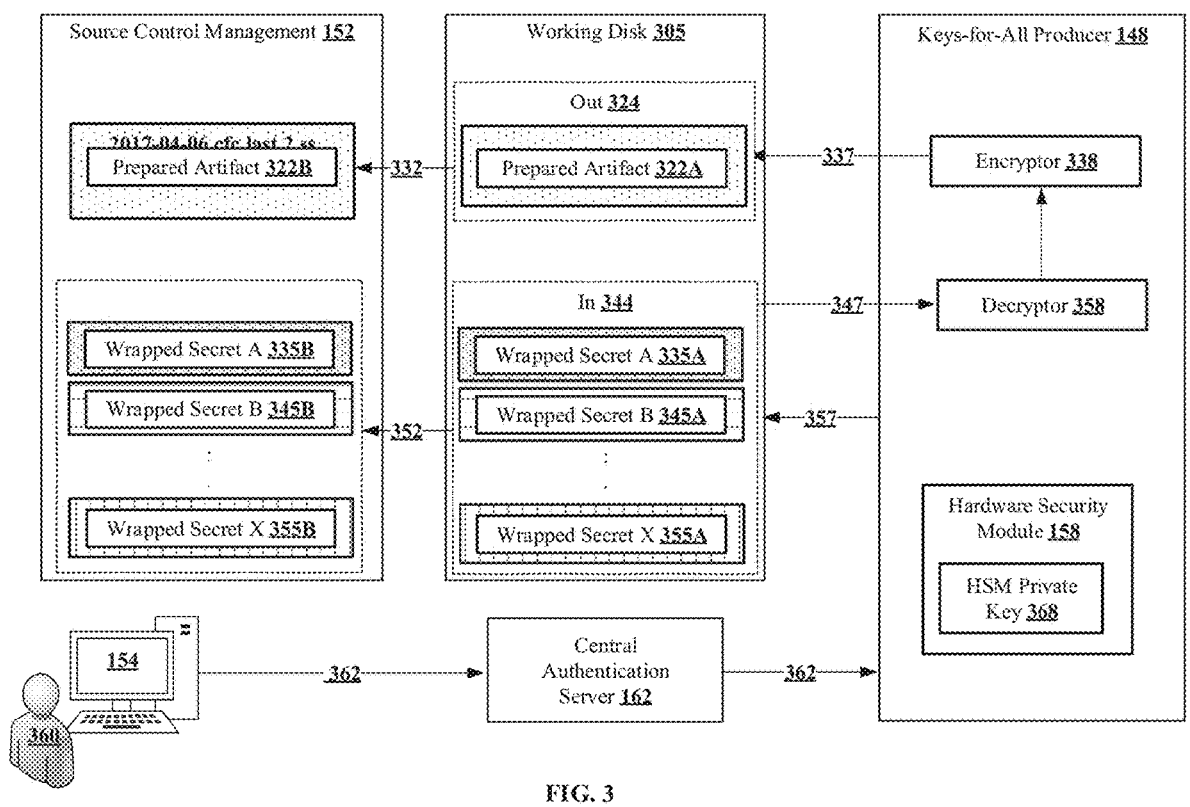
FIG. 3 shows an example message flow for mediating access by developers to secrets.

FIG. 3 shows an example block diagram 300 and message flow for mediating access by developers to secrets, including passwords, needed for running enterprise applications. Developer 360 authenticates via a central authentication server 162. One implementation of authentication is via public-key cryptography over the wire. The user's device registers the developer's public key to keys-for-all-producer 148 to register them as user. To authenticate the user, the user device signs a challenge from the server using the private key that it holds. After being authenticated, the developer request 362 gets sent to keys-for-all-producer 148—to ask for a new wrapped secret or to request that an existing key be wrapped. In one implementation, developer 360 receives an authentication certificate valid for one hour, for developing new secrets. In another implementation, the authentication certificate can be valid for a different period of time. Example calls from developer 360 to keys-for-all-producer 148 are listed next.

request=get [new secret]
request=wrap [secret 1]

Continuing with FIG. 3, keys-for-all-producer 148 wraps every different secret in a different key: wrapped secret A 335A, wrapped secret B 345A through wrapped secret X 355A. Each wrapped secret is shown with a different shading pattern to represent distinct key wrappings. Keys-for-all-producer 148 sends message 357 as a zipped file that includes wrapped secrets 335A, 345A through 355A, to input directory In 344 in working disk 305. In one example, the input directory includes a dozen encrypted JavaScript Object Notation (JSON) keys per application. Developer 360 checks wrapped secrets 335A through 355A into source control management 152 via message 352. Secrets are shown as wrapped secret A 335B, wrapped secret B 345B through wrapped secret X 355B with different shading patterns to represent distinct key wrappings. The path for the stored secrets is specified by the parent directory that includes input directory in 344 in the file system of working disk 305.

Sensitive information is always encrypted while at rest. In the example implementation described infra, keys are stored in JSON web key (JWK) format—a JSON data structure that represents a cryptographic key or a set of JWKs. RFC 7517 describes the JWK standard in detail. In the example listed next, key type parameter 'kty' is octets, with example key 'k4@$Test1234', and with key identifier 'kid': 'k4a-test-key-identifier' for the core application.

{"kty":"oct","k":"k4@$Test1234","kid":"k4a-test-key-identifier"}

In a directory, for an app it is common to have dozens of JSON Web Signature (JWS) files representing content secured with digital signatures or Message Authentication Codes (MACs) using JSON based data structures. An example directory structure for the file system is listed next—showing two example JWS files.

/kforaasecrets—directory for storing files
    /in—a subdirectory for storing generated encrypted files
        /upgdata.jws—an example JWS file, base64 encoded
        /test-ec.jws—another example JWS file
    /out—a subdirectory for storing the final zipped file
        /app-out.zip—zipped file containing the information
            /app-out.json—JSON file inside zip Further continuing with FIG. 3, in keys-for-all-producer 148, decryptor 358 receives and decrypts the received wrapped secrets from working disk 305, in file directory In 344, via message 347. After decryption, encryptor 338 encrypts the decrypted secrets with symmetric key and with HSM public key, zips the wrapped secrets, and sends the prepared artifact 322A to working disk 305 to file structure out 324, via message 337. In cryptography, a salt is random data that is used as an additional input to a one-way function that hashes a password or passphrase. In some implementations, encryptor 338 in keys-for-all-producer 148 generates passwords, salts, symmetric and asymmetric key material using multiple sources of hardware-based entropy. For example, encryptor 338 can generate 16 character passwords and 256 bit AES keys, and supports generation of 2048, 3072 and 4096 RSA keys, and supports EC curves secp256r1 and secp384r1 keys.

In the example directory structure listed earlier, app-out.zip is the zipped file containing all the information, where app is the name of the main application. Another example can be marketing-out.zip for a file containing secrets for an enterprise's marketing application. Developer 360 checks the prepared artifact 322B, app-out.zip in this example, into source control management 152 via message 332. Key material is ready for deployment to production once it has been checked in.

Figure 4:
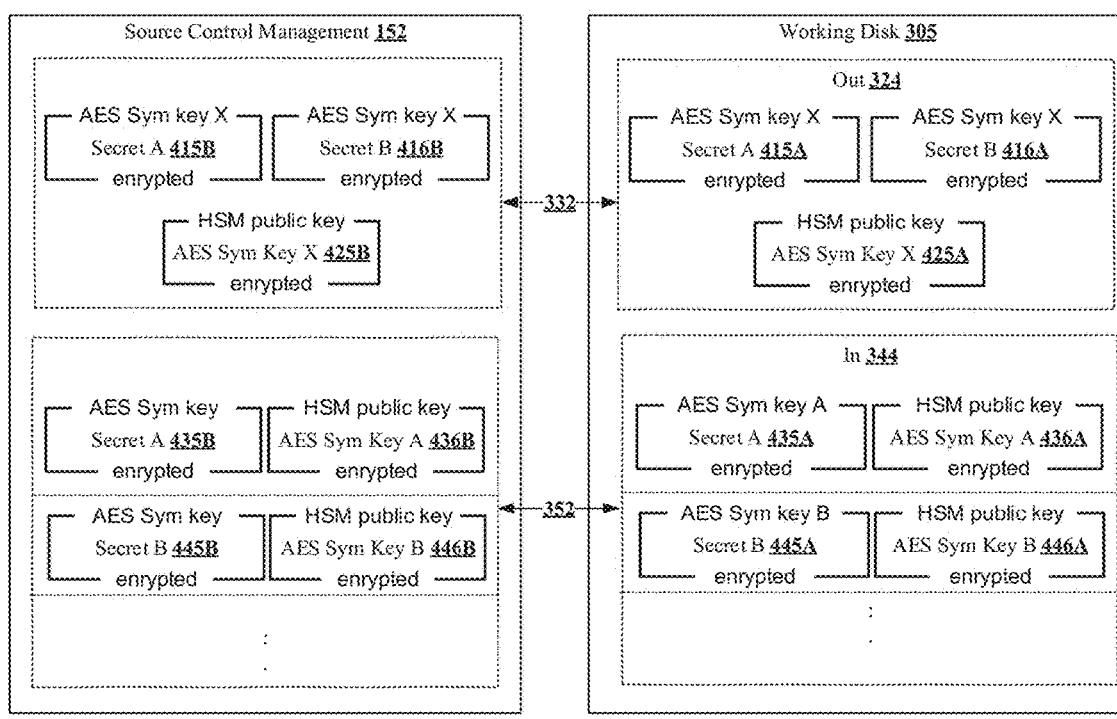
FIG. 4 shows example details for generation of wrapped secrets and keys, and checking in, of file directories of wrapped secrets and prepared artifacts, to source control management.

FIG. 4 shows block diagram details 400 for generation of wrapped secrets and checking in, of file directory in 344 and file out 324 of wrapped secrets and prepared artifacts, to source control management 152, from working disk 305. Secret A 435A gets encrypted with AES symmetric key A. In turn, AES symmetric key A 436A gets encrypted with HSM public key. Similarly, for secret B 445A gets encrypted with AES symmetric key B and in turn, AES symmetric key B 446A gets encrypted with HSM public key. For keys-for-all server 105, HSM public key 286 is utilized. For the disclosed technology, every secure server includes a separate hardware security module with independent HSM private key and HSM public key. Encrypted secrets 435A and 445A get checked in to source control management 152, as encrypted secret A 435B and encrypted secret B 445B through encrypted secret X (not shown) via message 352. Keys-for-all-producer 148 decrypts all AES keys with HSM, then uses the keys to decrypt the secrets, which are then re-encrypted using a single ephemeral AES key for scalability purposes. In one example, a dozen secrets for a marketing application are encrypted using a single AES symmetric key 425A. Keys-for-all-producer 148 zips the re-encrypted secrets and sends the single zipped file that includes encrypted secret A 415A, secret B 416A and AES symmetric key 425A to out 324 in working disk 305, which is accessible for the developer to check in the single zipped file that includes encrypted secret A 415B, secret B 416B and AES symmetric key X 425B—to source control management 152 via message 332.

In some use cases, encryption key rotation occurs on a regular basis, such as once every 24 hours, to reduce the period of access in the case of a security compromise. In one implementation, to recognize rotation of encryption keys or new underlying secrets, keys-for-all client 126 needs to restart. For use cases with multiple app servers, an enterprise typically implements rules that include staggering restart of servers, especially during peak periods of production use. In cases in which a developer requests and receives a new secret key, a new zipped file that includes the new encrypted secret replaces the existing zipped file, and is checked into out directory out 324 in multi-tenant data store 102.

In the production environment, keys-for-all client 126 accesses encrypted zipped secrets via source control management via message 332, and sends parts of the encrypted contents to keys-for-all server 105, to get information necessary to decrypt the data needed by the app 226.

In the example JSON app shown infra, keys-for-all server 105 specifies the server to which to make a request. Access definition is 'role-location'. Example 1000-phx.json, listed infra, includes key encrypting key maps (kekMap)—a list of the keys needed to decrypt the information. Role '1000' is the service that can consume the secret and the secret is consumable by a server requesting the secret from 'phx' data center in Phoenix.

1000-phx.json:
{
  "kekMap": {
    "sec0-kfora2-1-phx":"JWS_KEY",
    "sec0-kfora1-1-phx":"JWS_KEY",
  },
  "encryptedKeyMaterial":{
    "upgdata":"JWS_KEY",
    . . . additional examples . . .
  }
}

In the example, key-for-all client 126 selects 'sec0-kfora2-1-phx' and 'sec0-kfora1-1-phx' as the servers to which to make requests, and receives, in response, a JWK for each server that can be used to decrypt all the encrypted key material. A snippet of upgdata.jws is listed next.

{"nonce":
  "VFAZjOeHOZxxQ08sZowHtA\u003d\u003d",
"x5c":
  ["MIIDMDCCApGgAwIBAgICE40wCgYIKoZIzj0-EAwIwgaIxETAPBgNV BAMMCGs0YS1yb . . . QF-eCR1uQdsa5PfM0S wzaVO7n76A\u003d\u003d"],
"alg":"ES256",
"kid":"k4a-producer-signing",
"crit":["iat"],
"iat":1487272035443}

Nonce is an arbitrary number that may be used only once; it is a random or pseudo-random number issued in an authentication protocol to make two secrets with the same value look different. The key identifier, 'kid' is "k4a-producer-signing. The 'crit' (critical) header parameter indicates that extensions to this specification and/or JWA are being used that must be understood and processed. Its value is an array listing the header parameter names present in the JOSE header that use those extensions. If any of the listed extension header parameters are not understood and supported by the recipient, then the JWS is invalid. Producers must not include header Parameter names defined by this specification or JWA for use with JWS, duplicate names, or names that do not occur as header parameter names within the JOSE header in the "crit" list. Producers must not use the empty list "[ ]" as the "crit" value. Recipients may consider the JWS to be invalid if the critical list contains any header parameter names defined by this specification or JWA for use with JWS or if any other constraints on its use are violated. When used, this header parameter must be integrity protected; therefore, it must occur only within the JWS protected header. Use of this header parameter is optional and must be understood and processed by implementations. The 'iat' (issued at) claim identifies the time at which the JWT was issued. This claim can be used to determine the age of the JWT. Its value must be a number containing a 'NumericDate' value.

In one implementation, four key encrypting key maps can be sent: one for the local instance of the application, one for a specific role such as marketing or customer relationship management (CRM), etc., one for a certified physical location such as Phoenix or Chicago, and one for a logical location such as for a government-based special security server. Once key-for-all client 126 has the key encrypting key, it can decrypt all the encrypted key material and hold decrypted versions of secrets ready for use in the clear in volatile memory, in user space file system 136.

Figure 7:
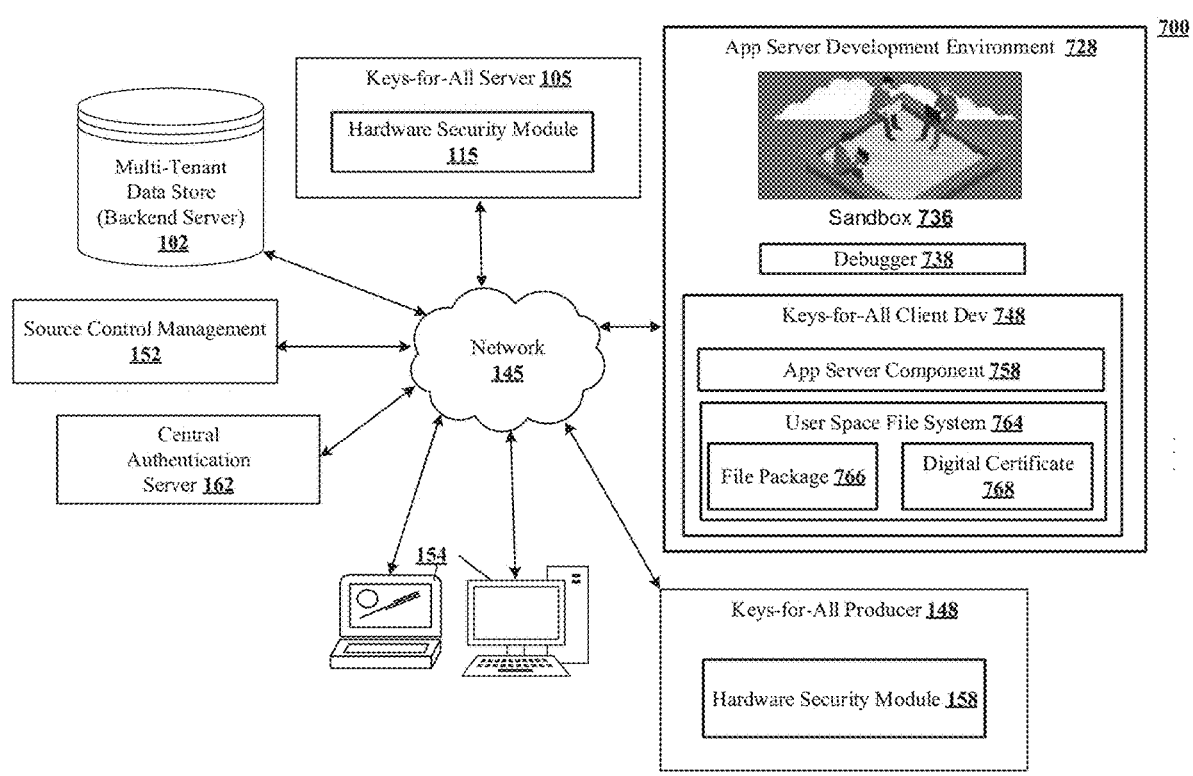
FIG. 7 shows a development environment for updating app components and developing new app components.

FIG. 7 shows an example environment 700 usable by developers to create and update applications that utilize secret key material. App server development environment 728 offers an integrated development platform on a developer's local machine or in the cloud—and includes sandbox 736 and debugger 738, which developers can utilize to prepare apps and app server components and to debug their applications. App server development environment 728 also includes a development version of keys-for-all (abbreviated K4A) client dev 748 which administers encryption, designed to allow retention of critical app functionality—like search, workflow, and validation rules—as well as full control over encryption keys, setting encrypted data permissions to protect sensitive data from unauthorized users. K4A client dev 748 includes app server component 758 and user space file system 764, with file package 766 and digital certificate 768. Environment 700 also includes keys-for-all server 105 and hardware security module (HSM) 115, source control management 152, central authentication server 162, and user computing devices 154 described in detail supra, relative to environment 100 shown in FIG. 1.

K4A client dev 748 of environment 700 is utilized to access K4A server 105 from which secrets are obtained for use with backend server: multi-tenant data store 102, during both development and production. K4A client dev 748 is configurable to provide indirect access by name to secrets used to access backend server 102, with the indirect access by name applying during both development and production, within respective development and production domains. K4A client dev 748 is configurable to launch app server component 758 which can be authorized, dependent on the launch, to request access to secrets, to obtain decrypted secrets from K4A server 105, responsive to a request from the authorized app server component 758, and to make the decrypted secrets retrievable by the authorized app server component 758, in a file package 766 stored in a secure user space file system 764 residing in an OS-protected user space within a volatile memory, using a name of the file package to interact with the secure file system. Digital certificate 768, in memory, securely identifies the app server and certifies its role and certifies its location within a location span. K4A client dev 748 is operable to track app server component 758, during production, after launch and verify that request messages for the decrypted secrets originate from the app server component 758 launched by K4A client dev 748. K4A client dev 748 processes a request from the app server component 758 by sending K4A server 105 a request, during development and production, accompanied by digital certificate 768 and obtaining from K4A server 105 the decrypted secrets.

An example code interface module usable by developers of an application for retrieving required secret key material is listed next. The example code module is implemented in Java. In one example, an exception gets logged when 'dbPassword' gets received when 'databasePassword' is expected.

```
public interface Vault {
    String getSecret(String keyIdentifier) throws IOException;
    byte[ ] getRawSecret(String keyIdentifier) throws IOException;
    PrivateKey getRSAPrivateKey(String keyIdentifier) throws IOException;
    PrivateKey getECPrivateKey(String keyIdentifier) throws IOException;
    X509Certificate[ ] getRSAKeyCertificateChain(String keyIdentifier) throws IOException;
    X509Certificate[ ] getECKeyCertificateChain(String keyIdentifier) throws IOException;
```

The disclosed system enhances system security by providing increased visibility and traceability—supported by the disclosed secret file architecture. Visibility auditing via system logs can include tracking of activity by user and by process ID that requests decryption keys. Identification occurs and can be logged at three distinct times in the process: at authentication at central authentication server 162, again at keys-for-all producer 148 when new keys are generated, and also at source control management 152 when encrypted secrets are checked in and when secrets are requested by keys-for-all client 126. Coordination and comparisons of the identity of users and processes for these three system logs offers in depth tracking options for security. In one example use case, system logs can be forwarded to the enterprise Computer Security Incidence Response Team (CSIRT), who can monitor requests by processes, running on the app server, that are authorized to request decryption services. In another use case, CSIRT can track key requests to the server for unusual activity when alerts occur. In an operations setting, traceability is enhanced by explicit restarts, so that a mistake does not spread far.

Workflow

Figure 5:
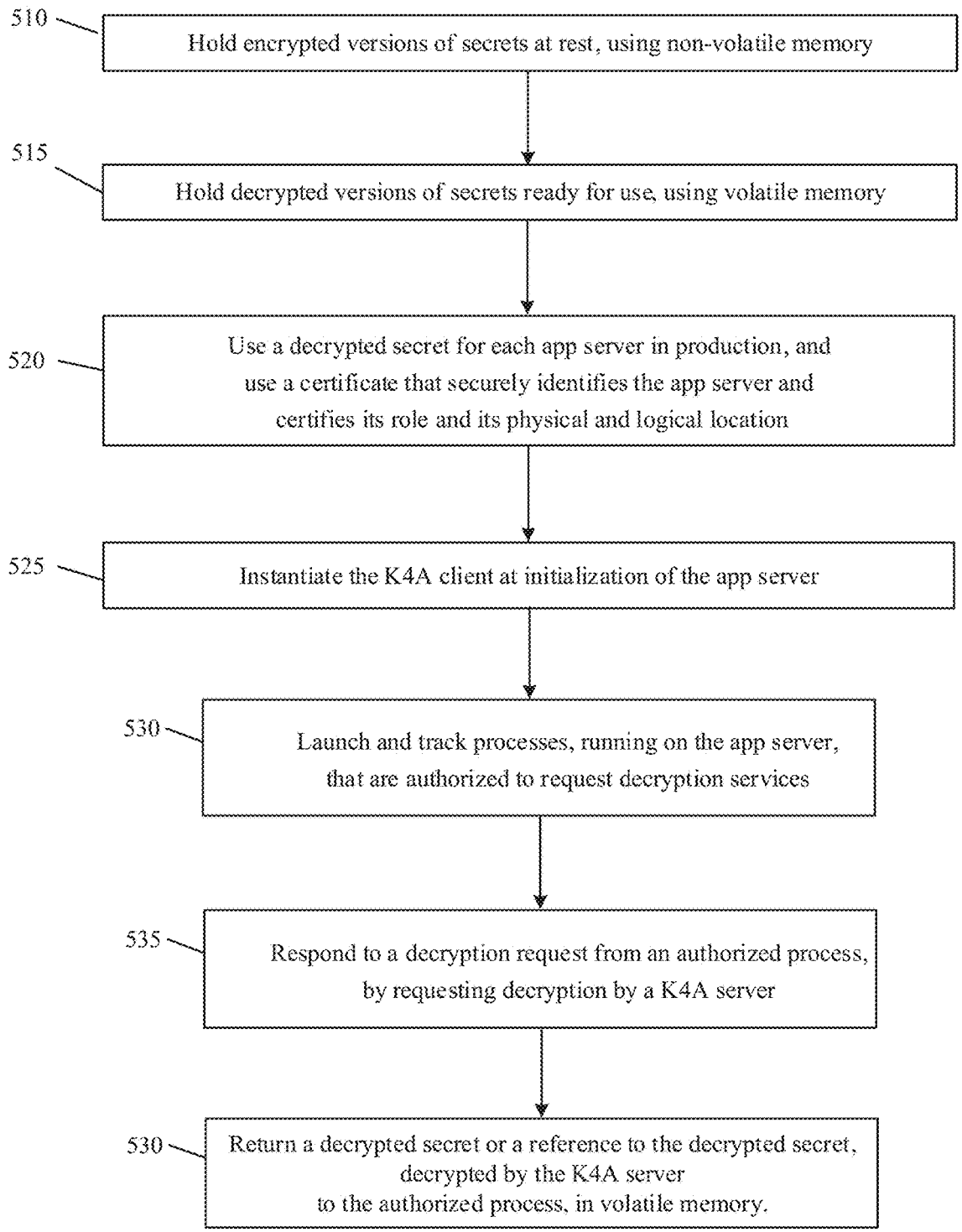
FIG. 5 is an example workflow of one implementation of an environment for accessing a secure backend system.

FIG. 5 is a flowchart 500 of one implementation of an environment for accessing a secure backend system that serves a plurality of hardware components. Flowchart 500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to a method.

At action 510, hold encrypted versions of secrets at rest, using non-volatile memory.

At action 515, hold decrypted versions of secrets ready for use, using volatile memory.

At action 520, use a decrypted secret for each app server in production, and use a certificate that securely identifies the app server and certifies its role and certifies its physical and logical location within a location span.

At action 525, instantiate the K4A client at initialization of the app server.

At action 530, the K4A client launches and tracks processes running on the app server, that are authorized to request decryption services.

At action 535, the K4A client responds to a decryption request from an authorized process, determined based on the tracking of the processes launched, by requesting decryption by a K4A server, using the certificate.

At action 540, the K4A client returns a decrypted secret or a reference to the decrypted secret, decrypted by the K4A server, to the authorized process, in volatile memory.

The actions described above can be subdivided into more steps or combined into fewer steps to carry out the method described using a different number or arrangement of steps.

Multi-Tenant Integration

Figure 6:
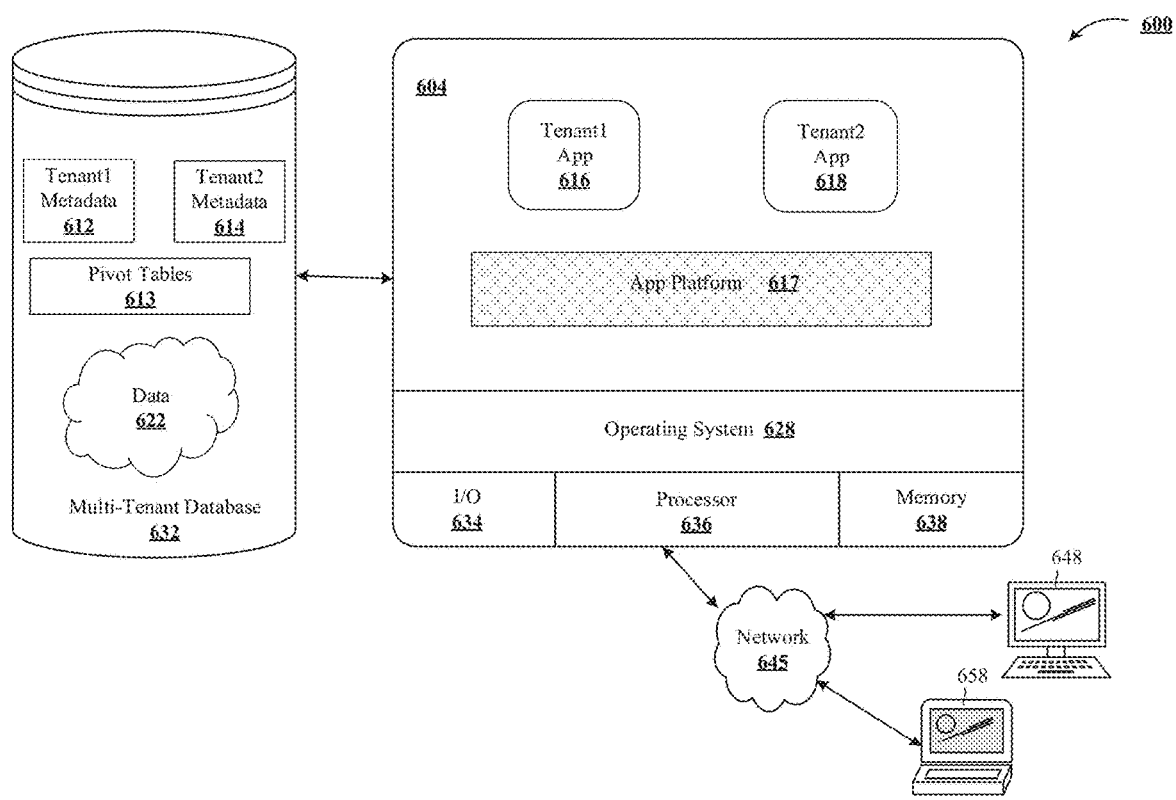
FIG. 6 shows a system environment for implementing a hardware system used to access a secure backend system.

FIG. 6 presents a block diagram of an exemplary multi-tenant system 600 suitable for implementing hardware system used to access a secure backend system in environment 100 of FIG. 1. In general, the illustrated multi-tenant system 600 of FIG. 6 includes a server 604 that dynamically supports virtual applications 616 and 618, based upon data 622 from a common database 632 that is shared between multiple tenants, alternatively referred to herein as a "multi-tenant database". Data and services generated by the virtual applications 616 and 618, including GUI clients, are provided via a network 645 to any number of client devices 648 or 658, as desired.

As used herein, a "tenant" or an "organization" refers to a group of one or more users that shares access to common subset of the data within the multi-tenant database 632. In this regard, each tenant includes one or more users associated with, assigned to, or otherwise belonging to that respective tenant. Stated another way, each respective user within the multi-tenant system 600 is associated with, assigned to, or otherwise belongs to a particular tenant of the plurality of tenants supported by the multi-tenant system 600. Tenants may represent users, user departments, work or legal organizations, and/or any other entities that maintain data for particular sets of users within the multi-tenant system 600. Although multiple tenants may share access to the server 604 and the database 632, the particular data and services provided from the server 604 to each tenant can be securely isolated from those provided to other tenants. The multi-tenant architecture therefore allows different sets of users to share functionality and hardware resources without necessarily sharing any of the data 622 belonging to or otherwise associated with other tenants.

The multi-tenant database 632 is any sort of repository or other data storage system capable of storing and managing the data 622 associated with any number of tenants. The database 632 may be implemented using any type of conventional database server hardware. In various implementations, the database 632 shares processing hardware with the server 604. In other implementations, the database 632 is implemented using separate physical and/or virtual database server hardware that communicates with the server 604 to perform the various functions described herein. The multi-tenant database 632 may alternatively be referred to herein as an on-demand database, in that the multi-tenant database 632 provides (or is available to provide) data at run-time to on-demand virtual applications 616 or 618 generated by the application platform 617, with tenant1 metadata 612 and tenant2 metadata 614 securely isolated.

In practice, the data 622 may be organized and formatted in any manner to support the application platform 622. In various implementations, conventional data relationships are established using any number of pivot tables 613 that establish indexing, uniqueness, relationships between entities, and/or other aspects of conventional database organization as desired.

The server 604 is implemented using one or more actual and/or virtual computing systems that collectively provide the dynamic application platform 617 for generating the virtual applications. For example, the server 604 may be implemented using a cluster of actual and/or virtual servers operating in conjunction with each other, typically in association with conventional network communications, cluster management, load balancing and other features as appropriate. The server 604 operates with any sort of conventional processing hardware such as a processor 636, memory 638, input/output features 634 and the like. The input/output 634 generally represent the interface(s) to networks (e.g., to the network 645, or any other local area, wide area or other network), mass storage, display devices, data entry devices and/or the like. User interface input devices 634 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 617.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 636 to the user or to another machine or computer system.

The processor 636 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 638 represents any non-transitory short or long term storage or other computer-readable media capable of storing programming instructions for execution on the processor 636, including any sort of random access memory (RAM), read only memory (ROM), flash memory, magnetic or optical mass storage, and/or the like. The computer-executable programming instructions, when read and executed by the server 604 and/or processor 636, cause the server 604 and/or processor 636 to create, generate, or otherwise facilitate the application platform 617 and/or virtual applications 616 and 618, and perform one or more additional tasks, operations, functions, and/or processes described herein. It should be noted that the memory 638 represents one suitable implementation of such computer-readable media, and alternatively or additionally, the server 604 could receive and cooperate with external computer-readable media that is realized as a portable or mobile component or application platform, e.g., a portable hard drive, a USB flash drive, an optical disc, or the like.

The application platform 617 is any sort of software application or other data processing engine that generates the virtual applications 616 and 618 that provide data and/or services to the client devices 648 and 658. In a typical implementation, the application platform 617 gains access to processing resources, communications interfaces and other features of the processing hardware using any sort of conventional or proprietary operating system 628. The virtual applications 616 and 618 are typically generated at run-time in response to input received from the client devices 648 and 658.

With continued reference to FIG. 6, the data and services provided by the server 604 can be retrieved using any sort of personal computer, mobile telephone, tablet or other network-enabled client device 648 or 658 on the network 645. In an exemplary implementation, the client device 648 or 658 includes a display device, such as a monitor, screen, or another conventional electronic display capable of graphically presenting data and/or information retrieved from the multi-tenant database 632.

In some implementations, network(s) 645 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

PARTICULAR IMPLEMENTATIONS

Some particular implementations and features are described in the following discussion.

In one implementation of a disclosed method of accessing a secure backend system that serves a plurality of hardware components, the hardware components include a keys-for-all (abbreviated K4A) server, and app servers running K4A clients, including holding encrypted versions of secrets at rest, using non-volatile memory; holding decrypted versions of secrets ready for use, using volatile memory; and using a decrypted secret for each application in production, and further using a certificate certifies its role and certifies its physical and logical location within a location span. The disclosed method also includes instantiating the K4A client at initialization of the app server, the K4A client: launching and tracking processes, running on the server, that are authorized to request decryption services; responding to a decryption request from an authorized process, determined based on the tracking of the processes launched, by requesting decryption by a K4A server, using the certificate; and returning to the authorized process, in volatile memory, a decrypted secret or a reference to the decrypted secret, decrypted by the K4A server.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some disclosed implementations of the method further include the K4A server communicating with the K4A client by a secure physical routing protocol; and decrypting only keys received from the K4A client that are consistent with the certified role and the certified physical and logical location and further consistent with secure physical routing over which the decryption request is received. In one implementation, the method further includes the K4A client accessing a source control management system to retrieve encrypted secrets and holding the encrypted secrets in volatile memory; and forwarding the retrieved encrypted secrets to the K4A server responsive to the decryption request received from the authorized process. In some implementations of the method, the hardware components further include a K4A producer producing the decrypted secret used in production and encrypting the decrypted secret to produce a corresponding encrypted secret that is stored in the source control management system. For some implementations of the disclosed method the K4A client stores the decrypted secrets in a user space file system in volatile memory. In some implementations, the user space file system is held in a volatile memory user space assigned and protected by an operating system. In some implementations, the authorized process is a child or grandchild process spawned by a parent authorized process launched by the K4A client and traceable using operating system resources to the parent authorized process. In one implementation of the disclosed method, the K4A client tracks by PID the processes running on the app server and verifies authorization of an authorized process to make the decryption request, based on a PID accompanying the decryption request message.

One implementation of the disclosed hardware system includes a plurality of hardware components that use non-volatile memory to hold encrypted versions of secrets at rest and that use volatile memory to hold decrypted versions of secrets ready for use, the hardware components including a keys-for-all (K4A) server, a source control management system and app servers running keys-for-all (K4A) clients. For the disclosed hardware, each app server that uses a decrypted secret in production to access the secure backend system further includes a certificate that securely identifies the app server and its role and physical and logical location within a location span. Further, at initialization of the app server, a K4A client is instantiated, on the app server, that launches and tracks all application processes on the app server that are authorized to request decryption services. In some implementations, the app server tracks by process identifier (PID). The K4A server disclosed in the hardware system is coupled with the K4A client by a secure physical routing protocol, and processes a decryption request from the K4A client in reliance on the app server certificate received from the K4A client for a certified role and a certified physical and logical location within a location span. Further, the disclosed K4A server only decrypts keys received from the K4A client that are consistent with the certified role and the certified physical and logical location and further consistent with secure physical routing over which the decryption request is received. The disclosed K4A client accesses the source control management system to retrieve encrypted secrets and stores the decrypted secrets in volatile memory; and only forwards to the K4A server a decryption request received from an authorized process.

That is, the application launched by the K4A client is the only process that can access unencrypted secrets and key material. The decrypted secrets can be stored in a user space file system. The authorized process can be a child or grandchild of a process that client launched, in some implementations. The disclosed K4A client returns in volatile memory a decrypted secret or a reference to a decrypted secret responsive to the decryption request from the authorized process.

In another implementation, a disclosed hardware system used to access a secure backend system, includes a plurality of hardware components that use non-volatile memory to hold encrypted versions of secrets at rest and that use volatile memory to hold decrypted versions of secrets ready for use, the hardware components including a keys-for-all (abbreviated K4A) server, and app servers running K4A clients. Each app server uses a decrypted secret in production to access the secure backend system further includes a certificate that securely identifies the app server and certifies its role and certifies its physical and logical location within a location span. At initialization of the app server, a K4A client is instantiated that launches and tracks processes, running on the app server, that are authorized to request decryption services. The K4A client responds to a decryption request from an authorized process, determined based on the tracking of the processes launched, by requesting decryption by a K4A server, using the certificate, and returns to the authorized process, in volatile memory, a decrypted secret or a reference to the decrypted secret, decrypted by the K4A server.

The disclosed hardware system further includes the K4A server coupled with the K4A client by a secure physical routing protocol; and the K4A server only decrypts keys received from the K4A client that are consistent with the certified role and the certified physical and logical location of the app server and further consistent with secure physical routing over which the decryption request is received.

The disclosed system can also include the K4A client that accesses a source control management system to retrieve encrypted secrets and holds the encrypted secrets in volatile memory; and forwards the retrieved encrypted secrets to the K4A server responsive to the request from the authorized process. In some implementations, the hardware components further include a source control management system; and the K4A client accesses the source control management system to retrieve encrypted secrets and stores the encrypted secrets in volatile memory. The disclosed system additionally includes a K4A producer that produces the decrypted secret used in production and produces a corresponding encrypted secret that is stored in the source control management system.

For some disclosed hardware systems, the K4A client stores the decrypted secret in a user space file system in the volatile memory, in which the user space is assigned and protected by an operating system. In some disclosed systems, the authorized process is a child process spawned by a parent authorized process launched by the K4A client and traceable using operating system resources to the parent authorized process. In yet other implementations of the disclosed system, the authorized process is a grandchild process spawned by a child process spawned by a parent authorized process launched by the K4A client and traceable using operating system resources to the parent authorized process. For the disclosed hardware system, the K4A client tracks by PID the authorized processes running on the app server and uses the PID to verify that a decryption request message is authorized.

For one implementation of the disclosed technology, a non-transitory computer readable media includes computer program instructions that, when executed, cause a computer to implement the K4A server coupled with the K4A client by a secure physical routing protocol; processing a decryption request from the K4A client in reliance on the app server certificate received from the K4A client for a certified role and a certified physical and logical location within a location span; and decrypting only keys received from the K4A client that are consistent with the certified role and the certified physical and logical location and further consistent with secure physical routing over which the decryption request is received.

In one implementation, a K4A client having versions used to provide access to a K4A server from which secrets are obtained for use with a backend sever, during both development and production, implemented as a device includes the K4A client, running on a processor coupled to memory, configurable to provide indirect access by name to secrets used to access a backend server, with the indirect access by name applying during both development and production, within respective development and production domains. The disclosed implementation also includes the K4A client configurable to launch an app server component that can be authorized, dependent on the launch, to request access to secrets, to obtain decrypted secrets from the K4A server, responsive to a request from the authorized app server component, and to make the decrypted secrets retrievable by the authorized app server component, in a file package stored in a secure file system residing in an OS-protected user space within a volatile memory, using a name of the file package to interact with the secure file system. Further included is a digital certificate in memory that securely identifies the app server and certifies its role and certifies its location within a location span. Additionally, the K4A client is operable to track the app server component, during production, after launch and verify that request messages for the decrypted secrets originate from the app server component launched by the K4A client and to process a request from the app server component by sending the K4A server a request, during development and production, accompanied by the certificate and obtaining from the K4A server the decrypted secrets.

Some implementations of the disclosed K4A client further include the K4A client coupled to the K4A server by a secure physical routing protocol; and the digital certificate sent to the K4A server identifying the location of the app server consistent with a physical routing origin of the secure physical routing protocol, thereby providing physical location assurance to the K4A server. In some cases, the K4A client further includes the digital certificate sent to the K4A server identifying the location of the app server in a logical zone that is allowed to access the backend server and not in a logical zone that is denied access to the backend server. In one case, logical zones can be implemented to distinguish between government servers and commercial servers.

In one disclosed implementation, an app server development environment described supra further includes a debugger running on the app server in the development environment and controlling execution of the app server component after launch of the app server component by the K4A client.

In yet another implementation, an app server development environment includes a sandbox environment using the indirection to access secrets during interaction with a development backend server in the development domain and using the indirection, without need for modification, to access secrets during interaction with a production backend server in the production domain. In some cases, the K4A client is further operable to access a source control management system to retrieve encrypted secrets and hold the encrypted secrets in the volatile memory; and forward the retrieved encrypted secrets to the K4A server for decryption, responsive to the request from the authorized process. In some cases the K4A client is further operable, in production, to trace spawning of a child process by the app server component launched by the K4A client and to extend authorization, dependent on the launch, to the child process. Further disclosed, the K4A client can be operable, in production, to trace spawning of a child process by the app server component launched by the K4A client, to trace spawning of a grandchild process by the child process, and to extend authorization, dependent on the launch, to the grandchild process.

For some disclosed implementations, the K4A client is further operable, in production, to track by process ID (abbreviated PID) the launched app server component and to use the PID to verify that the request messages for the decrypted secrets originate from the app server component launched by the K4A client.

One disclosed implementation includes a method of software development and operation in production, that implements a keys-for-all (abbreviated K4A) client having versions used to provide access a K4A server during both development and production, including providing the K4A client configurable to provide indirect access by name to secrets used to access a backend server, with the indirect access by name applying during both development and production, within respective development and production domains; the K4A client, running on a processor coupled to memory, configurable to carry out launching an app server component that can be authorized, dependent on the launch, to request access to secrets, obtaining decrypted secrets from the K4A server, responsive to a request from the authorized app server component, and making the decrypted secrets retrievable by the authorized app server component, in a file package stored in a secure file system residing in an OS-protected user space within a volatile memory, using a name of the file package to interact with the secure file system. The disclosed method further includes accessing a digital certificate in memory that securely identifies the app server and certifies its role and certifies its location within a location span; and the K4A client further tracking the app server component, during production, after launch and verifying that request messages for the decrypted secrets originate from the app server component launched by the K4A client, processing a request from the app server component by sending the K4A server a request, during development and production, accompanied by the certificate, and obtaining from the K4A server the decrypted secrets.

The disclosed method further includes the K4A client obtaining the decrypted secrets by receiving the decrypted secrets from the K4A server in the secure file system residing in the OS-protected user space within the volatile memory. The method can further include the K4A client obtaining the decrypted secrets from the K4A server and placing the decrypted secrets in the secure file system residing in the OS-protected user space within the volatile memory. Some disclosed methods further include the K4A client communicating with the K4A server using a secure physical routing protocol; and the K4A client sending the digital certificate to the K4A server with the location of the app server identified consistent with a physical routing origin of the secure physical routing protocol, thereby providing physical location assurance to the K4A server.

The disclosed method further includes the K4A client using the indirection to access secrets during interaction with a development backend server in the development domain and using the indirection, without need for modification, to access secrets during interaction with a production backend server in the production domain. In some cases, the disclosed method also includes accessing a source control management system to retrieve encrypted secrets and holding the encrypted secrets in the volatile memory; and forwarding the retrieved encrypted secrets to the K4A server for decryption, responsive to the request from the authorized process. Further, the disclosed method can include, in production, tracking by process ID (abbreviated PID) the launched app server component and using the PID to verify that the request messages for the decrypted secrets originate from the app server component launched by the K4A client.

Yet another implementation may include a tangible non-transitory computer readable storage media including computer program instructions that, when loaded into memory and executed, cause a computer to implement any of the methods described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A server system used to access a secure backend system, including:
   non-volatile memory including an encrypted version of a secret at rest;
   volatile memory; and
   one or more processors or circuits coupled to the volatile memory and non-volatile memory, and configured to:
   a certificate that securely identifies the server system and certifies a role of the server system and certifies a physical and logical location of the server system within a location span;
   instantiate the K4A client based on initialization of a K4A server;
   launch and track, via the K4A client, a process running on the server system that is authorized to request decryption services;
   receive, via the K4A client based on the certificate, a decrypted version of the secret from the K4A server in response to a decryption request from the process;
   provide, within the volatile memory, via the K4A client, the decrypted version of the secret to the process; and
   access the secure backend system using the decrypted version of the secret.

2. The hardware system of claim 1, wherein the K4A client is coupled to the K4A server by a secure physical routing protocol, and the one or more processors and/or circuits are further configured to:
   send, via the secure physical routing protocol, the decryption request to the K4A server, the decryption request including an encrypted version of the secret associated with the physical and the logical location of the server system.

3. The hardware system of claim 1, wherein the one or more processors and/or circuits are further configured to:
   access, via the K4A client, a source control management system to retrieve an encrypted version of the secret;

store the encrypted version of the secret in the volatile memory; and forward, via the K4A client, the encrypted version of the secret to the K4A server responsive to the request from the authorized process.

4. The hardware system of claim 1, wherein the one or more processors and/or circuits are further configured to receive an encrypted version of the secret from a K4A producer via a source control management system.

5. The hardware system of claim 1, wherein to provide the decrypted version of the secret to the process, the one or more processors and/or circuits are further configured to: store the decrypted version of the secret in a user space file system in the volatile memory.

6. The hardware system of claim 5, wherein the user space is assigned and protected by an operating system.

7. The hardware system of claim 1, wherein the process is an authorized process, and the one or more processors and/or circuits are further configured to:
spawn the authorized process via a parent process launched by the K4A client, wherein the authorized process is traceable to the parent process using operating system resources.

8. The hardware system of claim 1, wherein the process is an authorized process, and the one or more processors and/or circuits are further configured to:
spawn the authorized process as a grandchild process from a child process spawned from a parent process launched by the K4A client, wherein the authorized process is traceable to the parent process using operating system resources.

9. The hardware system of claim 1, wherein the process is an authorized process, and the one or more processors and/or circuits are further configured to:
track, via the K4A client, the authorized process based on a PID; and
verify that the decryption request based on the PID.

10. A method of accessing a secure backend system, the method including:
executing a keys-for-all (K4A) client associated with a certificate that securely identifies the server system and certifies a role of the server system and certifies a physical and a logical location of the server system within a location span;
instantiating the K4A client based on initialization of a K4A server;
launching and tracking, via the K4A client, a process running on the server system that is authorized to request decryption services;
receiving, via the K4A client based on the certificate, a decrypted version of the secret from the K4A server in response to a decryption request from the process;
providing, within the volatile memory, via the K4A client, the decrypted version of the secret to the process; and
accessing the secure backend system using the decrypted version of the secret.

11. The method of claim 10, further including:
sending, via a secure physical routing protocol, the decryption request to the K4A server, the decryption request including an encrypted version of the secret associated with the physical and the logical location of the server system.

12. The method of claim 10, wherein the process is an authorized process, and further including:
accessing, via the K4A client, a source control management system to retrieve an encrypted version of the secret;
storing, via the K4A client, the encrypted version of the secret in the volatile memory; and
forwarding, via the K4A client, the encrypted version of the secret to the K4A server responsive to the decryption request received from the authorized process.

13. The method of claim 10, further comprising receiving an encrypted version of the secret from a K4A producer via a source control management system.

14. The method of claim 10, wherein providing the decrypted version of the comprises storing the decrypted version of the secret in a user space file system in the volatile memory.

15. The method of claim 14, wherein the user space file system is held in a volatile memory user space assigned and protected by an operating system.

16. The method of claim 10, wherein the process is an authorized process, and further comprising spawning the authorized process via a parent process launched by the K4A client, wherein the authorized process is traceable to the parent process using operating system resources.

17. The method of claim 10, wherein the process is an authorized process, and further comprising:
tracking, via the K4A client, the authorized process based on a PID; and
verifying the decryption request based on the PID.

18. A non-transitory computer readable media, including program instructions loaded into memory that, when executed on processors, cause the processors to performing operations comprising:
executing a keys-for-all (K4A) client associated with a certificate that securely identifies a server system and certifies a role of the server system and certifies a physical and a logical location of the server system within a location span;
instantiating the K4A client based on initialization of a K4A server;
launching and tracking, via the K4A client, a process running on the server system that is authorized to request decryption services;
receiving, via the K4A client based on the certificate, a decrypted version of the secret from the K4A server in response to a decryption request from the process;
providing, within the volatile memory, via the K4A client, the decrypted version of the secret to the process; and
accessing a secure backend system using the decrypted version of the secret.

19. The non-transitory computer readable media of claim 18, the operations further including: sending, via a secure physical routing protocol, the decryption request to the K4A server, the decryption request including an encrypted version of the secret associated with the physical and the logical location of the server system.

20. The non-transitory computer readable media of claim 18, wherein the process is an authorized process, and the operations further including:
accessing, via the K4A client, a source control management system to retrieve an encrypted version of the secret;
storing, via the K4A client, the encrypted secrets in volatile memory; and
forwarding, via the K4A client, the encrypted version of the secret to the K4A server responsive to the decryption request received from the authorized process.

21. The non-transitory computer readable media of claim 18, the operations further comprising receiving an encrypted version of the secret from a K4A producer via a source control management system.

22. The non-transitory computer readable media of claim 18, wherein providing the decrypted version of the comprises storing the decrypted version of the secret in a user space file system in the volatile memory.

23. The non-transitory computer readable media of claim 22, wherein the user space file system is held in a volatile memory user space assigned and protected by an operating system.

24. The non-transitory computer readable media of claim 18, wherein the process is an authorized process, and the operations further including spawning the authorized process via a parent process launched by the K4A client, wherein the authorized process is traceable to the parent process using operating system resources.

25. The non-transitory computer readable media of claim 18, further including:
- tracking, via the K4A client, the authorized process based on a PID; and
- verifying the decryption request based on the PID.

* * * * *